UNITED STATES PATENT OFFICE.

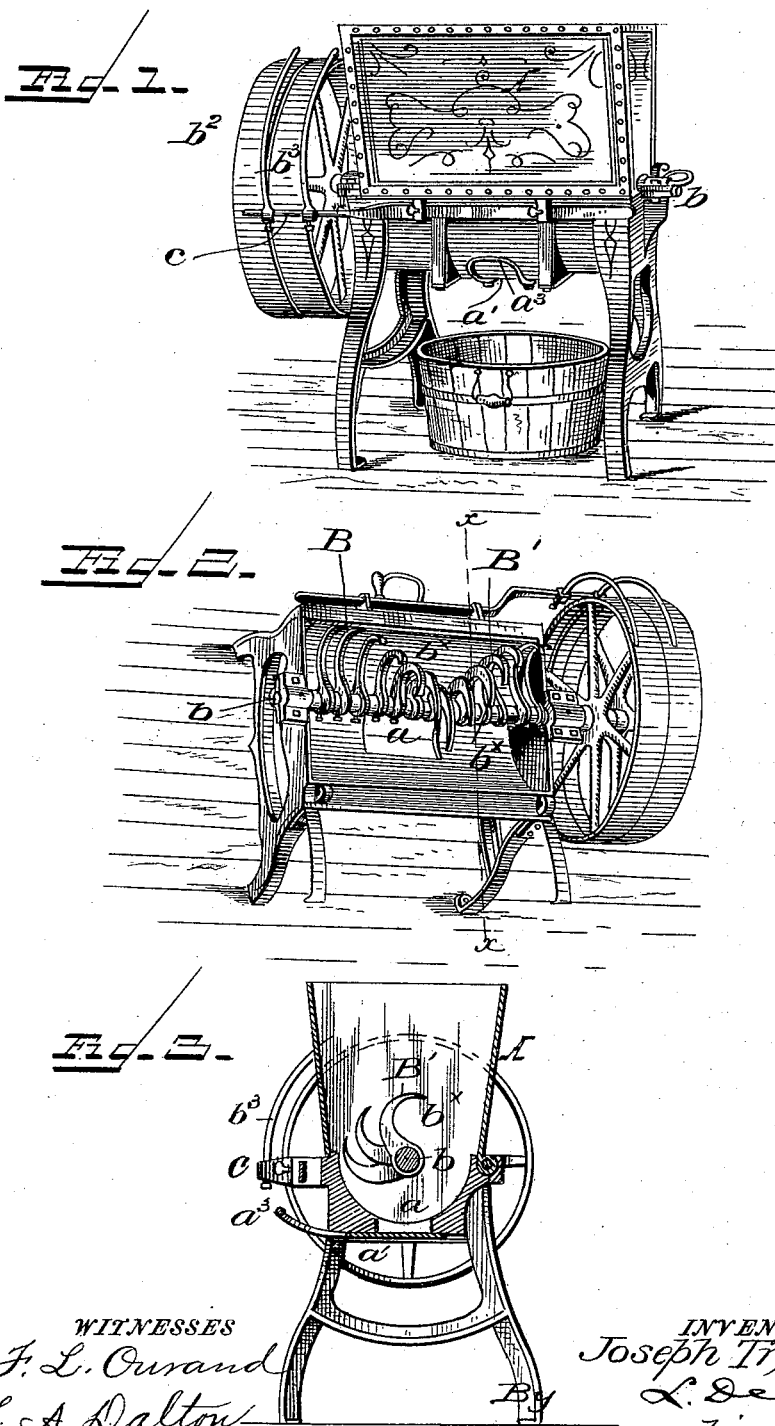

JOSEPH TRITZ, OF BURLINGTON, IOWA.

MEAT-MIXING MACHINE.

SPECIFICATION forming part of Letters Patent No. 488,098, dated December 13, 1892.

Application filed July 23, 1892. Serial No. 441,050. (No model.)

*To all whom it may concern:*

Be it known that I, JOSEPH TRITZ, a citizen of the United States, residing at Burlington, in the county of Des Moines and State of Iowa, have invented certain new and useful Improvements in Meat-Mixing Machines; and I do hereby declare the following to be a full, clear, and exact description of the invention, such as will enable others skilled in the art to which it appertains to make and use the same.

My invention relates to an improved meat-mixing machine; and it has for its object to effect the thorough mixing of the comminuted meat and the feeding of the meat after thus mixed all toward the center of the machine and there discharging it; and to these ends the invention consists, primarily, in the peculiar construction and arrangement of the stirring or mixing arms and the general combination and arrangement of parts, all substantially as hereinafter more fully disclosed, and pointed out in the claim.

In the accompanying drawings, Figure 1 is a perspective view of my improved meat-mixing machine. Fig. 2 is a central longitudinal section, and Fig. 3 is a cross-section, of the same.

In carrying out my invention I employ, as usual, a containing convex-bottomed receptacle A, suitably supported upon legs, which receptacle, however, has, unlike that of the ordinary type, a central discharging-opening $a$ in its bottom, closed by a suitable sliding plate or cover $a'$, having a bail-like handle $a^3$ for its manipulation.

B B' are two series of stirrers or arms carried by a longitudinal shaft $b$, journaled in suitable bearings or boxes $b'$, secured upon the top edges of the ends of the receptacle A, said shaft being equipped with loose and fast pulleys $b^2$ $b^3$ for driving the same, a belt-shifter $c$ also being employed in connection therewith for shifting the belt from one pulley to the other, as may be required. These, however, constitute no feature of my invention and will therefore not be further described herein.

The two series of stirrers consist of approximately half S-shaped or curved arms or blades $b^\times$ and set spirally around the shaft $b$, beginning with their outermost arms or blades at the ends of the latter, respectively, and having a general outline at their backs tapering or graded downward to the middle of the receptacle A, directly over the central opening $a$ thereof, all of the individual arms, though, being of the same or uniform length, as shown.

It is obvious that as the arms or stirrers B B' are revolved by turning their shaft they will not only effect the thorough commingling or mixing of the meat placed in the receptacle A, (the central discharging-opening $a$ then being closed,) but also carry the meat toward the center of the receptacle and cause the dropping or discharging of the same through said central opening. The meat or contents of the receptacle A, falling through the opening $a$, are received in a suitable vessel placed thereunder.

Having thus described my invention, what I claim as new, and desire to secure by Letters Patent, is—

In a meat-mixing machine, the combination, with a receptacle having a central discharge or opening, of two series of stirrers or arms set spirally around their shaft, the outermost arms beginning at the ends of the shaft, respectively, and having the general outline of their backs inclined or tapering toward the center of said receptacle, substantially as set forth.

In testimony whereof I affix my signature in presence of two witnesses.

JOS. TRITZ.

Witnesses:
J. M. VAN COTT,
CHAS. C. CLARK.